United States Patent Office 3,261,890
Patented July 19, 1966

3,261,890
TRANSESTERIFICATION OF PHOSPHORUS ESTERS
Irving Gordon and Charles F. Baranauckas, Niagara Falls, N.Y., assignors to Hooker Chemical Corporation, Niagara Falls, N.Y., a corporation of New York
No Drawing. Filed Nov. 30, 1962, Ser. No. 241,157
12 Claims. (Cl. 260—982)

This invention relates to a method for the preparation of phosphonates. More particularly, it relates to a novel process for the preparation of diorgano aliphatic phosphonates.

The diorgano aliphatic phosphonates of the invention have general utility as gasoline additives and flame-proofing additives for plastics or resins.

In accordance with this invention, it has been found that an ester interchange may take place between a phosphonate and a phosphite to yield a diorgano aliphatic phosphonate. It has been found that an ester interchange occurs by reacting a triaryl phosphite in which the aryl and heterocyclic groups contain from about 4 to about 18 carbon atoms, with a phosphorus compound. The phosphorus compounds which may be utilized in the process of the invention are known as trialiphatic phosphites and diorgano aliphatic phosphonates. The reaction of this invention may best be illustrated by the equation:

(1)
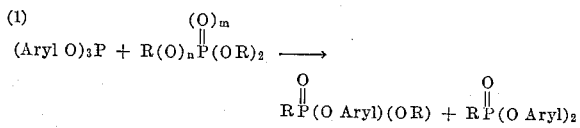

wherein R is an aliphatic group, i.e., alkyl or alkenyl containing between 1 and about 18 carbon atoms, $m$ and $n$ are from 0 to 1, and the sum thereof is equal to 1.

Examples of the trialiphatic phosphites suitable for utilization in this invention includes trimethyl phosphite, triethyl phosphite, triethenyl phosphite, tripropyl phosphite, tripropenyl phosphite, tributyl phosphite, tri-tertiary butyl phosphite, tripentylphosphite, trihexyl phosphite, triheptyl phosphite, trioctyl phosphite, tridodecyl phosphite, tris(2-chloroethyl) phosphite, tris(2,3-dichloropropyl) phosphite, tris(2-bromoethyl) phosphite, tris(2,3-dibromopropyl) phosphite, tris(2-bromo-3-chloropropyl) phosphite, tris(2,3-dibromopropyl) phosphite, tris(2,3-dichloropropyl) phosphite, tris(3-iodo-2-chloropropyl) phosphite, tristearyl phosphite, triisopentyl phosphite, tris(2-chloroisopropyl) phosphite, tris(2-bromopropyl) phosphite, triisohexyl phosphite, tri-2,2-dimethylbutyl phosphite, tri-2,3-dimethylbutyl phosphite, and the like phosphites. Mixed phosphites may also be suitable in the present invention.

Among the triaryl phosphites suitable for utilization in this invention are triphenyl phosphite, tri-p-cresyl phosphite, tri-o-cresyl phosphite, tri-m-cresyl phosphite, tri-2,4-xylenyl phosphite, tri-butylphenyl phosphite and other tri-alkylated aryl phosphites, tri-o-chlorophenyl phosphites, tri-p-chlorophenyl phosphites and tri-m-chlorophenyl phosphites, tri-o-bromophenyl phosphite, tri-p-bromophenyl phosphite, tri-m-bromophenyl phosphite, tri-thienyl phosphite, tricyclopentadiene phosphite and the like triaryl phosphites.

Representative of the dialkyl aliphatic phosphonates suitable for utilization in this invention are dimethyl methane phosphonate, diethyl methane phosphonate, dipropyl ethane phosphonate, dipropyl propane phosphonate, di-butyl propane phosphonate, di-butyl butane phosphonate, di-heptyl butane phosphonate, di-heptyl heptane phosphonate, di-methyl heptane phosphonate, di-heptyl methane phosphonate, di-hexyl hexane phosphonate, di-isohexyl hexane phosphonate, di-pentyl pentane phosphonate, di-dodecyl dodecane phosphonate, di-stearyl stearane phosphonate, dimethyl ethylene phosphonate, diethyl propylene phosphonate, and the like.

It is understood that the alkyl groups need not be similar but may be mixed, forming what are known in the art as mixed dialkyl aliphatic phosphonates.

The reaction of this invention will proceed slowly without a catalyst. Suitable catalysts utilized to increase the rate of reaction in this invention are alkyl halides or any Arbuzov type isomerization catalyst among which may be mentioned methyl halide, ethyl halide, propyl halide, butyl halide, pentyl halide, hexyl halide, heptyl halide, octyl halide, nonyl halide, decyl halide, undecyl halide, dodecyl halide, and the like. As may be most suitable in a particular reaction, iodine, bromine, chlorine or fluoride halide may be selected for utilization in the above disclosed catalysts. The amount of alkyl halide catalyst employed may vary over a considerable range. It may be as low as about 0.01 mole up to about 2 moles of catalytic alkyl halide per mole of phosphorus compound utilized. In most cases, however, amounts of catalysts varying from 0.01 mole to 0.05 mole per mole of phosphorus compound utilized are sufficient to effect an appreciable increase in the rate of reaction. Other types of catalyst suitable for utilization in this invention may be methyl sulfate, ethyl p-toluenesulfate, methanol, cuprous chloride, sodium iodide, iodine, a basic catalyst or heat of the reaction alone may take the place of a function as a catalyst. In carrying out the method of this invention with phosphorus compounds containing eight or more carbon atoms catalytic amounts of alkyl iodide are preferably utilized.

The reaction of this invention may be carried out by combining the reactants and heating to a suitable temperature ranging from about 145° C. to about 225° C. The reaction may initially be an exothermic one and in such an instance it may be required to control the reaction by utilizing cooling. Once the initial exothermic reaction is over, the reactants may be heated to a suitable temperature. The reaction is preferably conducted at a temperature ranging from 160° C. to 190° C. The most suitable temperature range was found to be between 180° C. and 225° C.

The proportions of the selected phosphorus compound and triaryl phosphite are approximately stoichiometric. Thus, there may be used 1 or 2 moles of the phosphorus compound depedning on the amount of aryl groups desired in the final product. If an alkyl aryl aliphatic phosphonate is desired, the preferred mole ratio of 1 mole of triphenyl phosphite to 2 moles of the selected phosphorus compound is utilized.

If a diaryl aliphatic phosphonate is desired then a 1:1 mole ratio may be utilized. The mol ratio in which the two reactants are reacted is preferably two moles of the phosphorus compound to one mole of the triaryl phosphite.

It is to be understood that mixtures of the diaryl and alkyl aryl aliphatic phosphonates are formed as illustrated by Equation 1 above and by the proper selection of molarity an increased yield of the desired product is obtained. The desired product may be recovered by fractional distillation and other known separation techniques. In the preferred molarities utilized, a greater percentage of alkyl aryl aliphatic phosphonate is separated from the diaryl aliphatic phosphonate.

The following examples are presented for the purpose of illustrating the claimed method of preparation of alkyl aryl alkane phosphonates. It is to be understood that the invention is not intended to be restricted to the specific illustrative examples below, and that modifications are included in the invention. In these examples and the rest of the specification and claims, all parts are by weight and all temperatures are in degrees centigrade, unless otherwise indicated.

Example 1

Triphenyl phosphite (155 parts, .5 mole) was reacted with trimethyl phosphite (124 parts, 1 mole) in the presence of methyl iodide (10 parts). The reaction mixture was heated to 100 degrees centigrade, after which the heat was removed and the exothermal reaction brought the pot temperature to about 150° C. A cooling system was utilized to keep the reaction temperature below 160° C. When the exothermal period was over, the mixture was heated at reflux (about 180–190° C.) for a total of 25 hours.

Infrared analysis showed the reaction mixture to contain about 90 percent of the mixed isomers, methyl phenyl methane phosphonate, and diphenyl methane phosphonate, about 10 percent dimethyl methyl phosphonate and less than 2 percent triphenyl phosphite. The methyl phenyl methane phosphonate is separable from the mixture by fractional distillation and a major proportion of the product so obtained is methyl phenyl methane phosphonate.

Example 2

Triphenyl phosphite (31 parts, 0.1 mole) was reacted with dimethyl methyl phosphonate (25 parts, 0.2 mole) in the presence of methyl iodide (12.9 parts) at 200° C. for 19 hours to produce phenyl methyl methyl phosphonate (56 parts) which when analyzed quantitatively by infrared analyses, was found to contain about 60 percent of the mixed isomers methyl phenyl methane phosphonate, diphenyl methane phosphonate, about 20 percent dimethyl methane phosphonate, and little or no triphenyl phosphite. The methyl phenyl methane phosphonate is separable from the mixture by fractional distillation and a major proportion of the product so obtained is methyl phenyl methane phosphonate.

Example 3

The procedure of Example 1 was followed utilizing 310 parts (1 mole) of triphenyl phosphite and 332 parts (2 moles) of triethyl phosphite in the presence of 8 parts of ethyl iodide. The mixture was maintained at a temperature of 210° C. for 25 hours. The mixture when analyzed quantitatively by infrared analysis was found to contain about 75 percent of mixed isomers of ethyl phenyl ethane phosphonate and diphenyl ethane phosphonate, about 15 percent diethyl ethane phosphonate, and little or no triphenyl phosphite.

The ethyl phenyl ethane phosphonate is separable from the mixture by fractional distillation and a major portion of the product so obtained is ethyl phenyl ethane phosphonate.

What is claimed is:

1. A process for preparing diorgano aliphatic phosphonates selected from the group consisting of

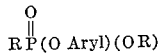

and

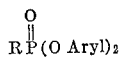

wherein aryl is of 6 to 18 carbon atoms, and R is selected from the group consisting of alkyl and alkenyl having from 1 to 18 carbon atoms, which comprises reacting a triaryl phosphite with a phosphorus compound of the formula

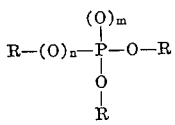

wherein $m$ and $n$ are from 0 to 1, with the sum thereof equal to 1.

2. A process according to claim 1 wherein the reactants are heated to a temperature of between about 180° C. and 225° C.

3. A process for preparing diorgano aliphatic phosphonates selected from the group consisting of

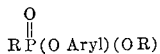

and

wherein aryl is of 6 to 18 carbon atoms, and R is selected from the group consisting of alkyl and alkenyl having from 1 to 18 carbon atoms, which comprises reacting in the presence of an Arbuzov isomerization catalyst a triaryl phosphite with a phosphorus compound of the formula

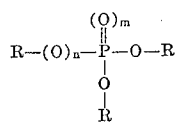

wherein $m$ and $n$ are from 0 to 1, with the sum thereof equal to 1.

4. A process according to claim 3 wherein the reactants are heated to a temperature of between about 180° C. and 225° C.

5. A process according to claim 3 wherein the triaryl phosphite is triphenyl phosphite.

6. A process according to claim 5 wherein the phosphorus compound is trimethyl phosphite.

7. A process according to claim 5 wherein the phosphorus compound is dimethyl methyl phosphonate.

8. A process for preparing diorgano aliphatic phosphonates selected from the group consisting of

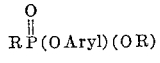

and

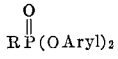

wherein aryl is of 6 to 18 carbon atoms, and R is selected from the group consisting of alkyl and alkenyl having from 1 to 18 carbon atoms, which comprises reacting about one mole of a triaryl phosphite with about one to two moles of a phosphorus compound of the formula

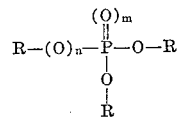

wherein $m$ and $n$ are from 0 to 1, with the sum thereof equal to 1, at a temperature from 100 degrees centigrade to 225 degrees centigrade.

9. A process for preparing an alkyl aryl aliphatic phosphonate of the formula

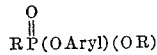

wherein aryl is of 6 to 18 carbon atoms, and R is selected from the group consisting of alkyl and alkenyl having from 1 to 18 carbon atoms, which comprises reacting about 1 mole of a triaryl phosphite with about 2 moles of a phosphorus compound of the formula

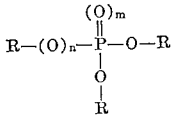

wherein $m$ and $n$ are from 0 to 1, with the sum thereof equal to 1, at a temperature from 100 degrees centigrade to 225 degrees centigrade, and separating said alkyl aryl aliphatic phosphonate from the reaction mixture.

10. The process according to claim 9 wherein a catalytic amount of an Arbuzov isomerization catalyst is utilized.

11. A process for preparing a diaryl aliphatic phosphonate of the formula

wherein aryl is of 6 to 18 carbon atoms, and R is selected from the group consisting of alkyl and alkenyl having from 1 to 18 carbon atoms, which comprises reacting about 1 mole of a triaryl phosphite with about 1 mole of a phosphorus compound of the formula

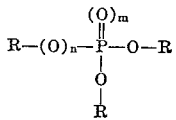

wherein $m$ and $n$ are from 0 to 1, with the sum thereof equal to 1, at a temperature from 100 degrees centigrade to 225 degrees centigrade, and separating said diaryl aliphatic phosphonate from the reaction mixture.

12. The process according to claim 11 wherein a catalytic amount of an Arbuzov isomerization catalyst is utilized.

No references cited.

CHARLES B. PARKER, *Primary Examiner.*

IRVING MARCUS, *Examiner.*

F. M. SIKORA, R. L. RAYMOND, *Assistant Examiners.*